United States Patent
Lewis et al.

(10) Patent No.: US 10,494,761 B2
(45) Date of Patent: Dec. 3, 2019

(54) FIBER SURFACE FINISH ENHANCED FLOCKED IMPACT FORCE ABSORBING STRUCTURE AND MANUFACTURING

(71) Applicant: UNIVERSITY OF MASSACHUSETTS, Boston, MA (US)

(72) Inventors: Armand F. Lewis, Mattapoisett, MA (US); Yong K. Kim, Dartmouth, MA (US)

(73) Assignee: University of Massachusetts, Boston, MA (US)

(*) Notice: Subject to any disclaimer, the term of this patent is extended or adjusted under 35 U.S.C. 154(b) by 261 days.

(21) Appl. No.: 15/385,226

(22) Filed: Dec. 20, 2016

(65) Prior Publication Data

US 2018/0016719 A1     Jan. 18, 2018

Related U.S. Application Data (60) Provisional application No. 62/361,080, filed on Jul. 12, 2016.

(51) Int. Cl.

| | |
|---|---|
| *D06N 3/00* | (2006.01) |
| *D06N 7/00* | (2006.01) |
| *A42B 3/06* | (2006.01) |
| *B32B 5/12* | (2006.01) |

(Continued)

(52) U.S. Cl.
CPC ............ *D06N 3/004* (2013.01); *A42B 3/061* (2013.01); *A42B 3/063* (2013.01); *B32B 5/12* (2013.01); *D04H 11/00* (2013.01); *D06N 7/0097* (2013.01); *B05D 1/14* (2013.01); *D10B 2401/06* (2013.01); *D10B 2501/042* (2013.01); *Y10T 428/23914* (2015.04); *Y10T 428/23943* (2015.04); *Y10T 428/23986* (2015.04)

(58) Field of Classification Search
CPC ........ D06N 7/0097; D06N 3/004; B32B 5/12; B05D 1/14; A42B 3/063; Y10T 428/23914; Y10T 428/23943; Y10T 428/23986

See application file for complete search history.

(56) References Cited

U.S. PATENT DOCUMENTS

| | | |
|---|---|---|
| 2,019,186 A | 10/1935 | Kaiser |
| 2,187,140 A | 1/1940 | Farish et al. |

(Continued)

FOREIGN PATENT DOCUMENTS

| | | | |
|---|---|---|---|
| CN | 102605509 A | | 7/2012 |
| CN | 107060273 A | * | 8/2017 |

(Continued)

OTHER PUBLICATIONS

International Search Report, PCT/US2017/041449, dated Oct. 18, 2017, pp. 4.

(Continued)

*Primary Examiner* — Cheryl Juska
(74) *Attorney, Agent, or Firm* — Armis IP Law, LLC (57) ABSTRACT

Embodiments of fiber surface finish enhanced flocked surface impact force absorbing structure include a plurality of flock fibers disposed on a substrate, a surface coating applied to the plurality of flock fibers, and in another embodiment, a divider fabric bonded to the tops of flock fibers.

14 Claims, 4 Drawing Sheets

(51) Int. Cl.
*D04H 11/00* (2006.01)
*B05D 1/14* (2006.01)

(56) References Cited

U.S. PATENT DOCUMENTS

| | | | |
|---|---|---|---|
| 2,283,480 A * | 5/1942 | Wilkerson | B44C 1/175 |
| | | | 428/88 |
| 2,303,203 A | 11/1942 | Farish et al. | |
| 2,317,595 A | 4/1943 | Farish | |
| 2,362,786 A * | 11/1944 | Williams | F41H 3/02 |
| | | | 427/206 |
| 2,425,235 A | 8/1947 | Ferrante | |
| 2,425,236 A | 8/1947 | Ferrante | |
| 2,478,097 A | 8/1949 | Glanzer | |
| 2,945,557 A | 7/1960 | Powers | |
| 2,999,763 A | 9/1961 | Sommer | |
| 3,018,845 A | 1/1962 | Powers | |
| 3,215,584 A | 11/1965 | McConnell et al. | |
| 3,496,054 A | 2/1970 | Baigas, Jr. | |
| 3,583,890 A | 6/1971 | Klockmann | |
| 3,641,976 A * | 2/1972 | Corneau | B05C 19/002 |
| | | | 118/621 |
| 3,772,132 A | 11/1973 | Dulin, Jr. | |
| 3,815,341 A | 6/1974 | Hamano | |
| 3,828,934 A | 8/1974 | Green et al. | |
| 3,860,469 A | 1/1975 | Gregorian et al. | |
| 3,961,115 A | 6/1976 | Klein | |
| 3,961,116 A | 6/1976 | Klein | |
| 4,016,317 A | 4/1977 | Kalwaites | |
| 4,035,532 A * | 7/1977 | Gregorian | B05D 1/16 |
| | | | 156/230 |
| 4,078,106 A | 3/1978 | Lind | |
| 4,092,246 A | 5/1978 | Kummer | |
| 4,246,308 A | 1/1981 | Walsh | |
| 4,282,051 A * | 8/1981 | Terpay | A47G 27/045 |
| | | | 156/71 |
| 4,297,404 A | 10/1981 | Nguyen | |
| 4,461,791 A | 6/1984 | Matsui et al. | |
| 4,622,253 A | 11/1986 | Levy | |
| 4,636,417 A | 1/1987 | Rasmussen | |
| 4,699,818 A | 10/1987 | Evans et al. | |
| 4,758,453 A | 7/1988 | Challet et al. | |
| 4,808,458 A * | 2/1989 | Watt | B32B 27/12 |
| | | | 427/200 |
| 4,847,133 A | 7/1989 | Foxman | |
| 4,908,128 A | 3/1990 | Chiba | |
| 5,047,103 A * | 9/1991 | Abrams | B05D 1/16 |
| | | | 156/241 |
| 5,219,469 A | 6/1993 | Binzer et al. | |
| 5,389,247 A | 2/1995 | Woodside | |
| 5,492,753 A * | 2/1996 | Levy | A41D 13/1209 |
| | | | 2/115 |
| 5,543,194 A | 8/1996 | Rudy | |
| 5,985,148 A | 11/1999 | Liu | |
| 6,060,145 A | 5/2000 | Smith et al. | |
| 6,103,641 A | 8/2000 | Ghering, Jr. | |
| 6,159,372 A | 12/2000 | Yang | |
| 6,171,677 B1 * | 1/2001 | Oikawa | A63B 49/08 |
| | | | 428/90 |
| 6,602,407 B2 | 8/2003 | Talbot et al. | |
| 6,692,811 B1 | 2/2004 | Lasko | |
| 6,713,151 B1 * | 3/2004 | Dean | B32B 5/16 |
| | | | 361/704 |
| 8,533,869 B1 | 9/2013 | Capuano | |
| 8,850,692 B2 | 10/2014 | Han | |
| 9,440,413 B2 * | 9/2016 | Lewis | B32B 5/12 |
| 9,321,218 B2 | 10/2016 | Han | |
| 9,788,589 B2 * | 10/2017 | Lewis | B32B 5/022 |
| 2001/0008039 A1 | 7/2001 | Alboom et al. | |
| 2002/0023871 A1 | 2/2002 | Talbot et al. | |
| 2004/0137190 A1 | 7/2004 | Lasko | |
| 2004/0171321 A1 | 9/2004 | Plant | |
| 2005/0014437 A1 | 1/2005 | Yoshida | |
| 2005/0247403 A1 * | 11/2005 | Chan | A63H 9/00 |
| | | | 156/279 |
| 2005/0266204 A1 * | 12/2005 | Abrams | B29C 45/14811 |
| | | | 428/90 |
| 2006/0228967 A1 | 10/2006 | Gladfelter | |
| 2007/0289688 A1 * | 12/2007 | Abrams | B05D 1/16 |
| | | | 156/72 |
| 2008/0193709 A1 | 8/2008 | Han | |
| 2008/0274326 A1 | 11/2008 | Kim et al. | |
| 2009/0035599 A1 * | 2/2009 | Kim | C02F 3/103 |
| | | | 428/596 |
| 2010/0028552 A1 | 2/2010 | Stieber | |
| 2011/0209595 A1 | 9/2011 | Han | |
| 2012/0177861 A1 | 7/2012 | Eleazer et al. | |
| 2012/0186002 A1 | 7/2012 | Bhatnagar et al. | |
| 2013/0115408 A1 | 5/2013 | Abrams | |
| 2013/0122256 A1 | 5/2013 | Kleiven et al. | |
| 2013/0298317 A1 | 11/2013 | Fonte et al. | |
| 2013/0330502 A1 * | 12/2013 | Lewis | B32B 5/12 |
| | | | 428/90 |
| 2014/0037890 A1 * | 2/2014 | McJunkins | C09D 5/028 |
| | | | 428/90 |
| 2015/0211185 A1 * | 7/2015 | Kien | D04H 1/70 |
| | | | 428/340 |
| 2016/0243787 A1 | 8/2016 | Han | |
| 2016/0265157 A1 * | 9/2016 | Rice | B32B 27/12 |
| 2016/0302507 A1 * | 10/2016 | Lewis | B32B 5/022 |
| 2016/0368240 A1 * | 12/2016 | Lewis | B32B 5/12 |
| 2017/0225447 A1 * | 8/2017 | Varadan | H05K 1/038 |
| 2018/0092420 A1 * | 4/2018 | Lewis | A42B 3/069 |
| 2018/0222146 A1 * | 8/2018 | Rice | B32B 5/12 |

FOREIGN PATENT DOCUMENTS

| | | | | |
|---|---|---|---|---|
| JP | 62140679 A | * | 6/1987 | |
| JP | 07-300758 A | | 11/1995 | |
| KR | 1020080003406 A | | 1/2008 | |
| WO | 2004012933 A1 | | 2/2004 | |
| WO | 2012087406 A2 | | 6/2012 | |
| WO | 2015084709 A1 | | 6/2015 | |
| WO | WO-2015084709 A1 | * | 6/2015 | B32B 5/022 |

OTHER PUBLICATIONS

Brady, S., et al., "Wearable Sensors? What is There to Sense?", Studies in Health and Informatics, 117:80-88 (2005).

Dunne, L.E., et al., "Initial Development and Testing of a Novel Foam-Based Pressure Sensor for Wearable Sensing", Journal of NeuoEngineering and Rehabilitation, 2(4): 7 pages, (2005).

Liu, Y., et al., "Compression Behavior of Warp-Knitted Spacer Fabrics for Cushioning Applications", Textile Research Journal, 11 pages, Aug. 2, 2011, downloaded from URL:http://trj.sagepub.com/content/early/2011/07/31/0040517511416283.

Qiao, P., et al., "Impact Mechanics and High-Energy Absorbing Materials: Review", Journal of Aerospace Engineering, 21(4):235-248 (2008).

Torg, MD, J.S., et al., "Retrospective Report on the Effectiveness of a Polyurethane Football Helmet Cover on the Repeated Occurrence of Cerebral Concussioins", The American Journal of Orthopedics, 28(2):128-132 (1999).

Notification of Transmittal of the International Search Report and the Written Opinion of the International Searching Authority for PCT/US2014/067883, "Flexible, Fibrous Energy Managing Composite Panels", dated Mar. 31, 2015.

Notification of Transmittal of the International Search Report and the Written Opinion of the International Searching Authority for PCT/US2016/020341, "Structured Flock Fiber Reinforced Layer", dated Jul. 25, 2016.

* cited by examiner

FIBER SURFACE FINISH ENHANCED FLOCKED IMPACT FORCE ABSORBING STRUCTURE AND MANUFACTURING

CROSS REFERENCE TO RELATED APPLICATIONS

This application claims the benefit of U.S. provisional patent application Ser. No.: 62/361,080 entitled "FIBER SURFACE FINISH ENHANCED FLOCKED SURFACE IMPACT ENERGY ABSORBING STRUCTURES AND MANUFACTURING," filed Jul. 12, 2016. This application is related to U.S. patent applications having Ser. Nos.: Ser. No. 13/906,901 entitled "PANEL FOR ABSORBING MECHANICAL IMPACT ENERGY AND METHOD OF MANUFACTURE," filed May 31, 2013 now U.S. Pat. No. 9,440,413 issued Sep. 13, 2016; Ser. No. 14/642,987 entitled "STRUCTURED FLOCK FIBER REINFORCED LAYER," filed Mar. 10, 2015; and Ser. No. 15/100,674 entitled "FLEXIBLE, FIBROUS ENERGY MANAGING COMPOSITE PANELS," filed Jun. 1, 2016. The entire teachings and contents of these Patent Applications are hereby incorporated by reference herein in their entireties.

FIELD OF THE INVENTION

The invention relates to flocked core spacer fabrics for flexible impact energy absorbing panels and flexible impact energy absorbing panels having enhanced Impact Force Absorbing (IFA) properties.

BACKGROUND

The need for energy absorbing padding to cushion mechanical impact loads is present in many environments. For example, personal protection equipment such as sport, military and construction helmets, shin guards and body part protectors typically include some form of cushioning layer.

Other environments where high impact forces are present are those involving body armor. For example, bulletproof vests typically are fabricated from polyaramid (Kevlar®), polyolefin fibers, woven or mat fabrics having high impact and cut resistance. When struck by a blunt projectile, these vests and similar clothing can impress a direct force on the wearer's body area that, while potentially life-saving, can cause significant bodily bruising and/or a bone fracturing injury.

Flocked Energy Absorbing Material (FEAM) Impact Force Absorbing (IFA) structures have been found to be effective IFA materials for Sport, Military and Civil Servant apparel and equipment applications. Thus far it has been observed that FEAM materials are generally not as effective in their IFA properties as comparable thickness of presently used foam (Vinyl Nitrile and Polyurethane) IFA materials.

SUMMARY

It would be an advantageous if FEAM structures had higher impact force absorbtion. It would also be advantageous that these improved IFA structures were easily manufactured. The inventors of the present application have discovered a surprising method for increasing the IFA properties of the FEAM structures as described below.

In one embodiment, an enhanced energy absorbing structure includes a substrate, a plurality of monofilament flock fibers, each having first and second ends, the fibers being attached, at their first ends to a surface of the substrate with the second ends of the fibers extending away from the substrate, and a surface coating applied to a surface of the plurality of monofilament flock fibers adjacent to the first end. Such a structure provides enhanced IFA properties for FEAM structures.

In a further embodiment, the enhanced energy and force absorbing structure includes a divider fabric bonded to the second ends of the plurality of monofilament flock fibers. In one embodiment, the divider fabric is a resinous surface coated divider fabric. In still another embodiment, the enhanced force absorbing structure includes a cover fabric surrounding the substrate and the plurality of monofilament flock fibers. The cover fabric includes, in one embodiment, a micro-suede cover fabric and the cover fabric can be perimeter sewn, for example, using loose through-stitch sewing.

In various embodiments, the surface coating includes, a silicone based water repellent resin spray-on coating, a flat finish polyurethane based varnish spray, a gloss finish varnish spray, a semi-gloss finish varnish spray, a water based acrylic varnish spray coating or a pigmented spray paint with nano-silica or alumina particles (e.g., alumina powder) and water based acrylic adhesives or coatings.

In still another embodiment, the enhanced energy absorbing structure further includes a second substrate disposed adjacent to the second ends of the plurality of monofilament flock fibers, a second plurality of monofilament flock fibers, each having first and second ends, the fibers being attached, at their first ends to a surface of the second substrate with the second ends of the fibers extending away from the second substrate, a surface coating applied to the second plurality of monofilament flock fibers and the surface coating can be applied on a portion of each of the second plurality of monofilament flock fibers adjacent to the first end. Embodiments of the enhanced energy absorbing structure include fibers having a fiber length of about 1 mm to about 7.5 mm, and denier of about 15 denier to about 100 denier. In another embodiment, the fiber enhanced energy absorbing structure the surface coating is a resin or a water based polymeric emulsion, and the surface coating can also include a silica or alumina particle friction enhancing component.

A technique for treating a fiber surface to enhance impact energy absorption includes flocking a plurality of fibers onto a substrate, coating a portion of first ends of the plurality of flock fibers with a surface coating and curing the surface coating. The technique further includes coating the plurality of fibers with a surface coating. The technique further includes coating the plurality of fibers with a surface coating after flocking the fibers onto the substrate.

The technique further includes coating an adhesive onto a divider fabric to form a surface coated impregnated divider fabric, placing the still fluid and uncured surface coated impregnated divider fabric between layers and in contact with flock fiber ends of at least two flocked fiber substrates while the adhesive is still fluid and curing the adhesive. The technique further includes loose through-stitch sewing the at least two layers. The technique further includes adhesively bonding unattached ends of the plurality of flock fibers to the impregnated divider fabric. The technique further includes wrapping the layers in micro-suede cover fabric and sewing the perimeter of the micro-suede cover fabric to envelop the assembled layers.

DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein:

DETAILED DESCRIPTION

Improved Impact Force Absorption (IFA) treated flock structures are provided, in one embodiment, by applying a resin coating to the flock fibers of a FEAM panel structure. At least two factors are responsible for the enhanced IFA properties: (a) the increase in frictional properties and enhanced inter-fiber entanglement of the flock fiber when these fibers are deformed during compression "impact" straining, and (b) the added resin coating around the individual flock fibers which stiffens the deforming flock fibers.

Figure 1A:
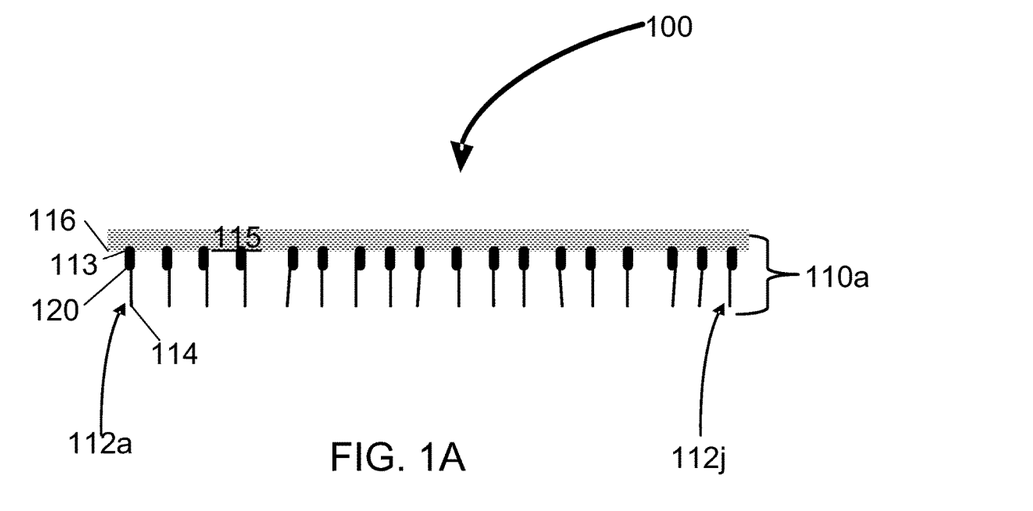
FIG. 1A is a schematic diagram of an impact force absorbing panel in accordance with one example embodiment disclosed herein.

Now referring to FIG. 1A, an exemplary enhanced energy absorbing structure 100 (also referred to as FEAM panel 100) includes a flocked energy absorbing material (FEAM) layer 110a. Here, single side flocked FEAM layer 110a includes a substrate 115 having a first surface 116, a plurality of monofilament fibers 112a-112j, each having a first end 113 and a second end 114, the fibers being attached, at their first ends 113 to the first surface 116 of the substrate 115 with the second ends 114 of the fibers extending away from the first surface 116 of the substrate 115. Each first end 113 of the plurality of monofilament fibers 112a-112j includes an application of a surface coating 120 which surprisingly provides enhanced energy absorbing properties. The surface coating includes, but is not limited to a silicone based water repellent resin spray-on coating, a flat finish polyurethane based varnish spray, a gloss finish varnish spray, a semigloss finish varnish spray, a water based acrylic varnish spray coating and a pigmented spray paint with nano-silica or alumina particles spray paint.

In one embodiment, the surfaces of the plurality of monofilament fibers 112 are coated with an externally applied surface finish and the thickness of the surface coating is generally about 0.05 mm to about 0.2 mm. The surface coating includes, but is not limited to, pigments having silica or alumina particles in the coating media (spray or dipping into a suspension/emulsion). The surface coating can be applied, for example, by dipping the flocked fibers in an emulsion or suspension of either water based or solvent based system.

In another embodiment, the applied surface coating has a thickness which depends on the denier of the plurality of monofilament fibers 112. For fibers 112 having a denier of about 2 to about 20 is the surface coating is generally about 1 to about 5 micrometers, and for fibers 112 having a denier of about 20 to about 100 the surface coating is generally about 5 to about 10 micrometers. In various embodiments a fiber density can be about 20 fibers per square mm (e.g., 100 denier fibers) to about 300 fibers per square mm (e.g., three denier fibers)

In one embodiment, a resinous coating is applied to the flocked surface using a brush or roller or a dipping technique. In order to deposit the proper amount of resin onto the flock fibers the resinous coating diluted with solvent and then the solvent is allowed to evaporate during the cure or setting of the coating. Dilution of these coatings with solvent (or water in water based resin coatings) will depend on the viscosity of the original resin coating. Dilutions of about 1:1 up to about 5:1 based on solvent to original resin coating concentration ratio are permissible. Generally the resin content of a coating is between about 15% and about 30% resinous solids by weight.

Figure 1B:
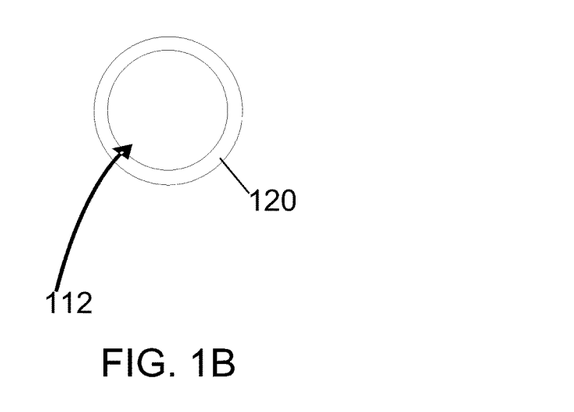
FIG. 1B is a schematic diagram of a flock fiber of the impact force absorbing panel of FIG. 1A including a surface coating applied the surface of the flock fiber.

Now referring to FIG. 1B, a cross sectional view of fiber 112 includes the surface coating 120. The surface coating 120 includes but is not limited to flat finish varnish spray, glossy finish varnish spray, water based varnish spray coatings and pigmented spray paint. The surface coating 120 can be applied by spraying or immersion-dipping the fibers into the coating medium. The substrate 115 includes, but is not limited to, a polyester nonwoven fabric, a polyamide nonwoven fabric, a woven polyester fabric, a woven polyamide fabric, a knitted polyester fabric and a knitted polyamide fabric. In various embodiments, the monofilament flock fibers 112 each have a fineness in the range of about 3 denier to about 60 denier and a length between about 0.5 mm to about 6 mm. The monofilament fibers 112 include, but are not limited to, fibers made of polyamide, polyester, polyimide, polyaramide (example, Kevlar®)), polyaromaticester (example, Vectra®), polysulfide, and polyolefins. In one embodiment, an adhesive is used to bond the monofilament fibers 112 onto the substrate 115.

Figure 2:
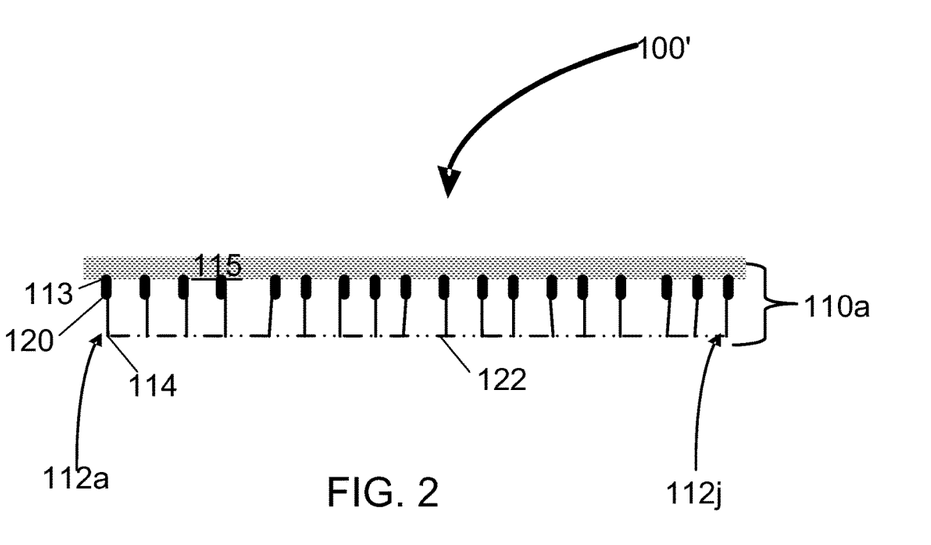
FIG. 2 is a schematic diagram of the impact force absorbing panel of FIG. 1A including a divider fabric.

Now referring to FIG. 2, an exemplary flexible, fibrous energy managing composite panel 100' (also referred to as FEAM panel 100') similar to FEAM panel 100 of FIG. 1 additionally includes at least one divider fabric 122 (e.g., fabric, sheet, foam, spacer fabric or film) bonded to the second ends 114 of the plurality of monofilament flock fibers 112.

Figure 3:
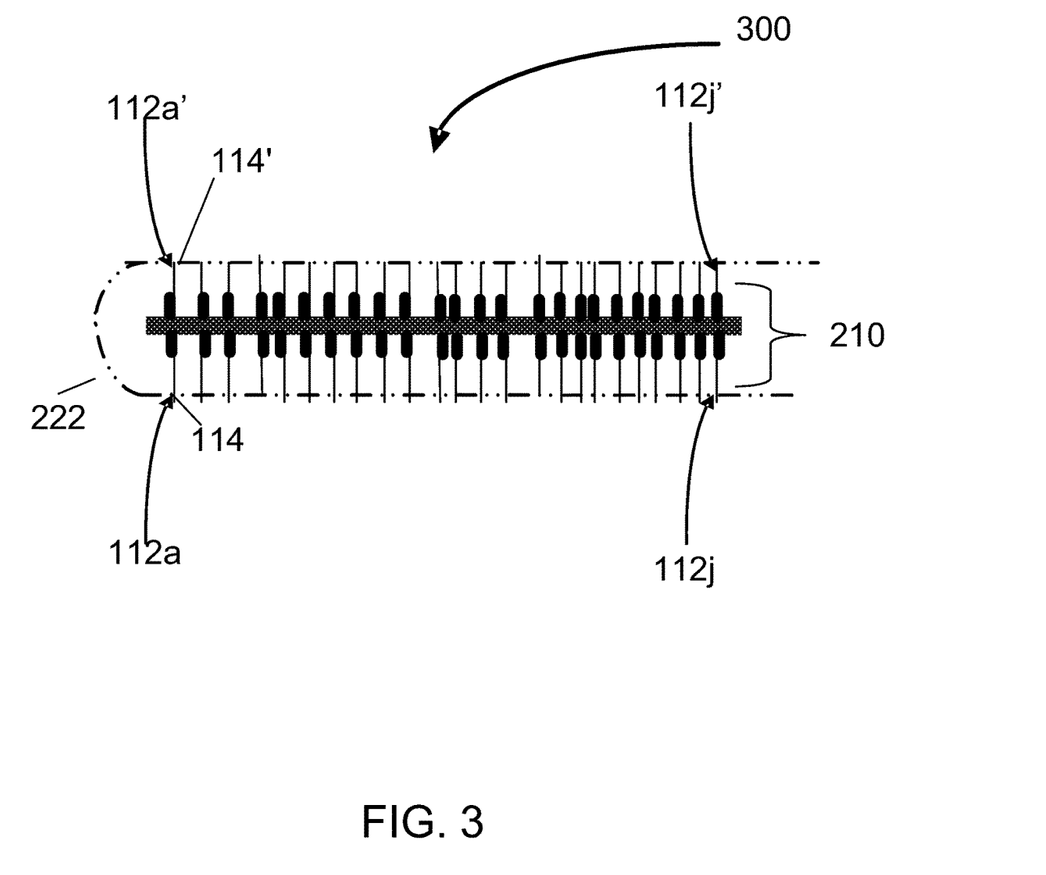
FIG. 3 is an alternate embodiment of the panel of FIG. 1 having multiple layers in accordance with embodiments disclosed herein.

Now referring to FIG. 3, an exemplary double sided flexible, fibrous impact force managing composite panel 300 (also referred to as FEAM panel 300) similar to FEAM panel 100 of FIG. 1 additionally includes a second a plurality of monofilament fibers 112a'-112j', each having a second end 114', at least one divider fabric 222 (e.g., fabric, sheet, foam, spacer fabric or film) bonded to the second ends 114 of the plurality of monofilament flock fibers 112 and second ends 114' of the plurality of monofilament flock fibers 112'.

In one embodiment, the resin modified FEAM configuration shown in FIG. 3 is prepared by pressing resinous coating saturated divider fabric against the ends of the flock surfaces of the double side flocked FEAM element. This can be done one side at a time or can be carried out by gently compressing two resin saturated divider fabric layers against the central FEAM element to affect contact of the resin saturated divider fabric to the ends of the flock fiber surface. The resin coating is allowed to cure or set by chemical reaction or by solvent evaporation under this gently compressed condition to finalize the exemplary double sided flexible, fibrous impact force managing composite panel 300 (also referred to as IFA layer material) shown in FIG. 3.

Figure 4:
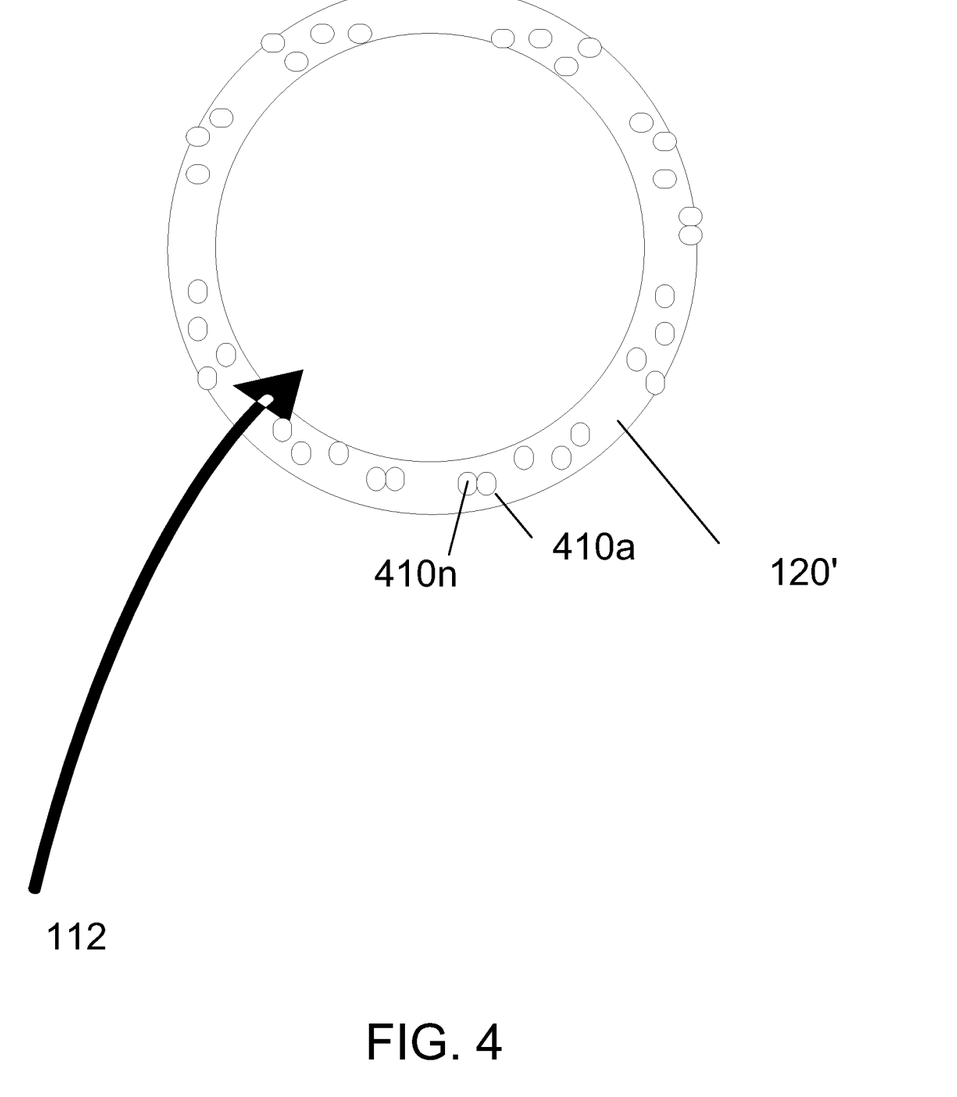
FIG. 4 is a schematic diagram of the surface coating applied the surface of the flock fiber of FIG. 1B including a silica or alumina friction enhancing component.

Now referring to FIG. 4, here showing a cross sectional end view of fiber 112 including the surface coating 120', here using a silica or alumina friction enhancing component. In one embodiment, the surface coating 120' is a pigmented spray paint with nano-silica or nano-alumina particles shown as embedded particles 410a-410n. The alumina particles can be introduced in powder form.

EXAMPLES

It is understood that the enhanced Impact Force Absorbing (IFA) structure can include multiple layers of both single sided and double sided flocked layers in combination with divider fabrics and cover fabric. Embodiments of these configurations are described below along with Impact force loss test results. The following nomenclature is used below in describing the IFA enhanced energy absorbing structure s: Here the FXyyz-f[D] [P] notation refers to "FX"=Flocked Experimental, " yy" refers to a yy Denier flock fiber used; "z" designates the flock fiber type and "D" refers to a Double-side flocked panel. The added "P" represents that the FEAM panel has been perforated with holes. The flock fiber type is determined as follows: Z=1 for Polyester (PET) fiber, Z=2 for Nylon fiber. "//" indicates that a divider fabric is being used and where it is positioned.

Example #1

Double Element IFA Structure

Three (3) FX201-2D Double-side flocked FEAM elements were assembled with a divider fabric between the first and third FEAM layer. This configuration can be written as FX202-2D//FX202-2D//FX202-2D where the // notation designates the position of the divider fabric.

Three individual three layer combined FEAM panels were prepared as follows: the FX202-2D designation represents a double-side flocked FEAM configuration fabricated using 2 mm long 20 denier nylon flock. A description of some fabricated samples is presented below:

(1) Designation: 43-A FX202-2D//FX202-2D//FX202-2D—Control Panel—no treatment of divider fabric (2) Designation: 43-B FX202-2D//cFX202-2D//cFX202-2D—Divider fabric (continuously) bonded to tops of flocked surfaces of FEAM (inner elements) using water based acrylic adhesive coating.

(3) Designation: 43-C FX202-2D//cFX202-2D//cFX202-2D—Divider fabric (continuously) bonded to tops of flocked surfaces of FEAM (inner elements) using a solvent based, flexible textile adhesive.

Both samples 43-B and 43-C were prepared by coating the adhesive coating onto the divider fabric and while the adhesive was still fluid (not cured) this resin impregnated divider fabric was placed between the inner FEAM layers. This assembly was then allowed to set overnight under light contact pressure to assure the adhesive bonding of the divider fabric to the tops of the flocked surfaces of the FEAM elements. After curing, all three of these multi-layer panels were wrapped in micro-suede cover fabric and perimeter sewn and were readied for impact testing.

These above samples were all tested by University of Massachusetts Dartmouth (UMD's) Ball Drop test where balls of various diameter and weight are dropped onto the panels that have been place on a flat metal support plate. This support plate is attached to the top of a PASCO force table where the "hit" force generated by the falling ball is recorded. In this measurement, the Impact Force Absorption (IFA) properties of the panel are recorded as the Force Loss % (FL %). This per cent value is determined relative to the peak "hit" force when no sample is on the force table platform. Using this test, FL % values for the three samples described above are reported in Table 1. From this we see that the FL % values for the two bonded divider fabric test samples (43-B and 43-C) have higher FL % values than the Control (43-A). These data provide an indication of the ability of the internally bonded to the flocked surface FEAM panels to enhance the IFA properties of a FEAM panel structure.

TABLE 1

Ball Drop IFA Properties of Special "Resin Assisted" FEAM Panels Using Various Ball Weight Projectiles (100 cm drop height for all balls)

| Lab ID | Description -) samples were wrapped in gray micro suede and perimeter sewn and panels were approximately 4" × 4" in size | Thickness (mm) | Areal Density (g/m$^2$) | Force Loss (%) DPB | Force Loss (%) BOB | Force Loss (% FHB |
|---|---|---|---|---|---|---|
| 43-A | FX202-2D//FX202-2D//FX202-2D [CONTROL PANEL] | 15.0 | 2531 | 1.0 ± 0.8 | 10 ± 2 | 25 ± 3 |
| 43-B | Like 43-A but divider fabric bonded to flock with water based acrylic coating | 15.0 | 2702 | 4.0 ± 3.1 | 12 ± 1 | 28 ± 2 |
| 43-C | Like 43-A but divider fabric bonded to flock with solvent based flexible adhesive. | 14.8 | 2969 | 7.0 ± 1.3 | 17 ± 1 | 31 ± 1 |

Abbreviations and Properties Ball Drop Projectiles
- (BB)—(Duckpin) Bowling Ball—Diameter 127 mm (5"), weight 1.7 kg Base Hit Force:=4600 N
- (BC)—Bocce Ball—Diameter 102 mm (4"), weight—543 grams Base Hit Force=2600 N
- (FH)—Field Hockey Ball—Diameter=70.8 mm (2¾"), Weight=162. grams Base Hit Force=963 N Table 1 Conclusions:
(1) The FL % value-trend of the FH-BC-BB ball (increasing projectile mass) follow the expected trend—Lighter projectile impacts result in higher FL %
(2) The BB, BC and FH data for the divider sheet bonded FEAM specimens (43-B and 43-C) have better IFA properties than the Control Panel (43-A)-non-bonded divider fabric.

(3) Divider fabric bonded to the FEAM's flock fiber tops with a solvent based adhesive demonstrated higher IFA capabilities than the water based coating bonded panel.

Example #2

Single Side Flocked Resin, Bonded IFA Structures

As a follow-on to Example #1, experiments were carried out to determine and comparing IFA effects of laying together single side flocked FEAM panels with and without inter-layer ply bonding. In these experiments a quantity of a black "twill" fabric panels were prepared by flocking 45 denier, 3 mm long flock fibers on one side (only). Using the UMD nomenclature scheme these panels can be designated as FX451-3S. Using these FX451-3S panels, two ten (10) layer test specimens were fabricated. One specimen was assembled by layering ten (10) elements together with no divider fabric and no between layer adhesive. Note that with such an assembly divider fabric is not needed, since the back side of the one-side flocked panel serves as the non-penetrating flock surface for the (loose) ends of the contiguous flock fiber of the adjacent ply. The other ten (10) layer specimen was prepared by applying adhesive to all the contacting surfaces (flocked and facing back of the adjacent element). This constituted a panel similar to what was described in Example 1. These two panels were then tested using UMD's Guided Weight Testing (GWD) apparatus where the Force Loss Per Cent (FL %) and deceleration G value (denoted by "G") were measured. In the engineering mechanics field, the lower the deceleration value, "G", the better the material is in absorbing impact force and energy. The GWD involves impacting the test sample with a hemispherical faced (5" diameter projection), 3.7 Kg mass projectile dropped at a height of 100 cm (one meter). The data obtained in these tests are presented in Table 2. Sample 90-B presents the non-bonded ten (10) layer specimen and sample 90-E presents the data for the bonded panel. As shown, the FL % value for the bonded specimen was about 41% higher than the non-bonded specimen. Correspondingly, the "G" value for the bonded specimen was about 26% lower than the non-bonded specimen's "G". These data clearly illustrate the merits of the subject invention. These data show that bonding the tops of the flocked surface fibers leads to a more impact force absorption and a lower "G" value Good IFA improvement was found in these samples.

To provide additional information as to the scope of this observation, several other specimens were prepared. Table 2's sample 90-C is a ten (10) flock surface assembly employing five (5) double side flocked panels (five (5) FX451-3D elements with divider fabric between the contacting flocked surfaces. Comparing the FL % and "G" values here indicate that it makes no difference whether you use single sided or double sided flocked FEAM panels as your starting point—so long as the number of flocked layers is the same, the FL % and "G" values are just about the same. Continuing further on these experiments, another test specimen, 90-D was prepared whereby four (4) flocked layers were bonded while the other flock layers were composed of six (6) flocked surfaces contained into three (3) double side flocked panels assembled with divider fabric. Sample 90-D is basically a combination of samples 90-E and 90-C. The FL % and "G" data obtained on this "hybrid processed" sample show the improvement in IFA properties. The FL % and "G" values for this 90-D specimen lie about half way between the 90-B and the 90-E sample. This observation further demonstrates the merits of the resin coating of flocked fiber idea of this invention.

TABLE 2

GWD FL % and "G" Results for Resin and Non-Resin Bonded FEAM Panels

| Lab ID | Description | Thickness (mm) | Areal Density (g/m$^2$) | Velocity (m/sec.) | "G" (deceleration) | GWD (FL %) 100 cm |
|---|---|---|---|---|---|---|
| 90-B | [FX451-3S] × 10 (twill) | 20.5 | 8285 | 3.18 | 87 ± 9 | 44 ± 1 |
| 90-C | [FX451-3D] × 5 (twill) -with divider fabric | 22.3 | 7695 | 3.16 | 85 ± 9 | 45 ± 1 |
| 90-D | [FX451-3S] × 4 (twill) Bonded layers/FX451-3D//FX451-3D//FX451-3D | 23.5 | 6939 | 3.15 | 78 ± 8 | 50 ± 1 |
| 90-E | [FX451-3S] × 10 (twill) Bonded layers | 26.9 | 8638 | 3.16 | 64 ± 3 | 62 ± 1 |
| | Baseline hit force (no sample) --- Newtons | | | | | 6892 ± 89 |

(a) All test values are an average of at least three (3) replicate determinations.
(b) 100 cm drop height, Hemi-Spherical (12.7 cm radius) projectile, mass=3.7 Kg.
(c) All test panels are 4"×4" samples except the US Army panels (5" diameter)
(d) All test panels were micro-suede fabric wrapped and perimeter sewn.

Table 2 Conclusion:
(1) The IFA properties of a layered FEAM structure are enhanced by the presence of interlayer adhesive coating/bonding as taught by the invention. This improvement in IFA is tempered by the increase in areal density of the additional resin containing FEAM panel. [Compare the 90-B (control result) with specimen 90-E and 90-D]

Example #3

Resin Treated Flock Fibers and Enhanced FEAM IFA Properties the effect of applying a resin coating to the flock fibers of a FEAM panel structure (element) on the IFA properties of this resin modified FEAM structure was evaluated. Two factors could change by doing this; (a) the frictional properties and inter-fiber rubbing of the flock fiber when these fibers are deformed during compressional "impact" straining, and (b) the added resin coating around the individual flock fibers could stiffen the flock fiber. This might be manifested by a 'pseudo increase" by external means of increasing the 'Apparent' denier of flocked fiber on the FEAM structure. The denier of a flocked surface could perhaps be increased by coating each individual flock fiber with a layer of resin.

Two special FEAM panels were prepared in the context of samples 45-A and 45-B as described in Table 3. These special FEAM panels were prepared by assembling two layers of a FEAM element fabricated using a low denier (5 denier), shorter length (0.5 mm) blue colored flock fiber on one side (this is the "velvet-feel" side of the FEAM element. The "back" side of this FEAM element was flocked with 45 denier, 2 mm long PET flock fiber (this is the IFA side of the FEAM element). The UMD nomenclature of this two FEAM layer panel is presented in Table 3 as samples 45-A and 45-B. These two samples were prepared with a divider fabric between the two facing FEAM-side flocked layers but this sample had no cover wrap. One sample (45-A) had no treatment on the FEAM's flock fiber (it was as is) while panel 45-B had its FEAM flock fiber side coated with a coating of a solvent based polyurethane varnish—Minwax® clear satin spray. This varnish coating was liberally applied to each flocked surface at an approximate 0.9 g/cm$^2$ coverage rate. Panel 45-B underwent a 24 hour curing/drying time at room temperature before testing. Testing of these samples involved the use of hitting the test sample with a 5 Kg rounded projectile from 1 meter drop height. Here the IFA data of interest are the SI (Severity Index) and "G". The Severity Index (SI) is a threshold value for a general category of head injuries based on scientific research and published data. SI is a method for measuring a sport helmet's ability to reduce impact forces to the head, integrating acceleration over time. SI provides an accurate way to assess head injury risk that can be replicated across laboratories and under different impact scenarios.

In these Table 3 tests, the most important parameter is the deceleration "G" value. "G" is a measure of the ability of a FEAM pad material to decelerate the "G" (gravitational force) of the projectile hitting the target pad. The lower this "G" value the better an IFA material is in absorbing impact; Lower "G" values are better than high. The comparative data in Table 3 show that the measured "G" values was lower when the FEAM's flock fibers were treated/coated with the PU varnish spray coating treatment. These "G" value was lowered by about 10% compared to the standard (no resin treated flock) FEAM Control.

Table 3 shows the SI and "G" data for the two comparable FEAM layer panels with and without resin coated flocked surfaces. Table 3 clearly shows that the sample with the resin coated flock (sample 45-B) shows both a lower Severity Index and a lower "G" value. This experiment clearly demonstrates the merit of resin coating of the flock fiber in a FEAM configuration to improve the IFA of a finished layered pad product.

TABLE 3

Effect of Resin Coating the FEAM Flock Fiber on the IFA Properties

| Lab ID | Description (a) (b) | Thickness (mm) | Areal Density (g/m$^2$) | Velocity (feet/sec.) | SI | "G" |
|---|---|---|---|---|---|---|
| 45-A | [FX052-2S-FX451-0.5S]//[FX451-2S-FX052-0.5 S] (blue "velvet" FEAM surfaced panels) (CONTROL | 7.0 | 1151 | 9.91 | 325 | 126 |
| 45-B | As 45-A but resin treated flock FEAM (on FX452-2S flocked side). | 7.5 | 1249 | 9.95 | 274 | 113 |

Table 3 Conclusion:

Spray coating of a polyurethane varnish on the flock fiber side of a "velvet" faced FEAM panel shows an improvement in the IFA properties of the two element layer FEAM panel ("G" is lower for the resin treated flock FEAM panel, 45-B, compared with the control (no resin treatment), 45-A.

Another series of experiments were carried out using FX202-2D FEAM layers as the effective IFA element. Here two layers of FX202-2D FEAM were layered together with a divider fabric in between the two layers. These panels were finally micro-sued wrapped and perimeter sewn. These panels, designated as 52-B and 52-C were subjected to the same impact test as what was used to generate the data in Table 3. In this experiment, the resin coated flock fiber FEAM panel, 52-C was subjected to three consecutive "HITS" by the 5 Kg projectile. IFA data for this experiment are presented in Table 4. First the data clearly indicate the improved IFA properties of the resin coated flock FEAM panel—compare samples 52-C with the Control, 52-B. Also, while this improved IFA property holds for three consecutive impacts, a slight decrease in IFA effectiveness was observed after the three consecutive impacts "HITS". It is expected the in effect will "level off" after additional impacts, but the overall improvement in IFA properties of the resin treated flock FEAM panel will remain.

TABLE 4

IFA Behavior of Resin Coated Flock FEAM Panels Under Consecutive (5 Kg mass) Projectile Impacts.

| Lab ID | Description: resin coatings were sprayed onto flock fibers; KIWI silicone heavy duty water repellant resin coating used | Thickness (mm) | Areal Density (g/m$^2$) | Velocity (f/s) | SI | "G" | % "G" reduction from control |
|---|---|---|---|---|---|---|---|
| 52-B | Control sample: FX202-2D//FX202-2D (with divider) | 9.5 | 1986 | 10.0 | 239 | 110 | NA(d) |
| 52-C | As 52-B but flock spray-coated with silicone water repellant | 9.5 | 2430 | 9.9 | 191 | 94 | 14.5% |
| 52-C | As 52-B but flock spray-coated with silicone water repellant | 9.5 | 2430 | 9.8 | 185 | 96 | 12.7% |
| 52-C | As 52-B but flock spray-coated with silicone water repellant | 9.5 | 2430 | 9.8 | 220 | 97 | 11.8% |

In some embodiments, flock surface treatments were cured at room temperature for at least 24 hours.

Table 4 Conclusion:
(1) The IFA (lowering of "G") of a resin coated flock FEAM panel deteriorates upon successive drop "hits" by a 5 Kg projectile mass at 100 cm (1 m) drop height.

Example #4

Resin Coated Flock FEAM and Effect of Graduated Stiffness Panels

In view of the promising results obtained in the IFA behavior of resin treated flock shown in Tables 3 and 4, another series of tests was carried out whereby experimental FEAM panels were prepared using 45 and 20 denier flock fibers. Several FEAM panels were prepared and FL % evaluated using the Ball Drop Test. Again some of these FEAM samples, which included resin coated flock, were IFA compared to suitable Controls (no resin coated flock). One panel (44-A) was fabricated where the three FEAM element panel was prepared where the top FEAM layer had no resin coat on the flock fibers, the middle FEAM panel had a light resin varnish coat and the third (or bottom) FEAM layer had a heavy resin varnish coat. As is reported, the FL % value of this "graduated stiffness" was also increased by the presence of resin coated flock. BDT data are summarized in Table 5 where the IFA enhancing effect of resin coated flock FEAM panels is clearly demonstrated. Of interest is the result on the "graduated stiffness" panel, 44-A. Where the IFA properties of this "graduated stiffness" assembled specimen had better IFA properties than the two controls—panels 43-A and 43-D. This presents a very useful helmet pad design feature for FEAM panels.

TABLE 5

Ball Drop IEA Properties of Special "Resin Assisted" FEAM Panels (Jan. 7, 2015) Using Various Ball Weight Projectiles (100 cm drop height for all balls)

| Lab ID | Description: samples were wrapped in micro suede fabric and perimeter sewn | Thickness (mm) | Areal Density (g/m$^2$) | Force Loss (%) (BB) | Force Loss (%) (BC) | Force Loss (%) (FH) |
|---|---|---|---|---|---|---|
| 49-A | FX451-3D (control) | 7.5 | 1236 | 12 ± 3 | 10 ± 3 | 19 ± 3 |
| 49-B | FX451-3D//FX451-3D (control) | 13.0 | 2011 | 14 ± 3 | 18 ± 2 | 36 ± 3 |
| 49-D | As 49-A but treated FEAM | 7.3 | 1124 | 14 ± 2 | 23 ± 7 | 25 ± 4 |
| 49-E | As 49-B but treated FEAM | 13.8 | 2070 | 24 ± 12 | 25 ± 2 | 39 ± 3 |
| 43-A | FX202-2D//FX202-2D//FX202-2D [CONTROL PANEL] - - No resin treatment. | 15.0 | 2531 | 1.0 ± 0.8 | 10 ± 2 | 25 ± 3 |
| 43-D | FX202-2Dc//FX202-2Dc//FX202-2Dc Each FEAM layer coated with a layer of Minwax PU varnish and dried then assembled. Resin stiffens flock fibers. | 15.0 | 3164 | 9.6 ± 1.9 | 19 ± 1 | 26 ± 1 |
| 44-A | Gradual Stiffness FEAM FX202-2D (no resin coat)//FX202-2D (moderate resin coat)//FX202-2D(heavy resin coat). (Hit on top-soft side); graduated stiffness three-layer FEAM panel | 15.3 | 3055 | 7.4 ± 1.3 | 15 ± 1 | 31 ± 4 |

Table 5 Conclusions:
(1) The FL % trend that lower weight projectiles have a higher FL % IEA is generally followed.
(2) Enhanced IFA properties can be seen by comparing the IFA properties of samples 49-D and 49-E with their representative controls
(3) The "graduated stiffness" panel, 44-A, clearly demonstrates the improvement in IFA properties of IFA materials when such panels are prepared where the intended "HIT" side of the layered panel is softer than the back (or bottom) side of the layered panel assembly.

Example #5

Concentration of Resin Coating on Flock Needed to Enhance the IFA Properties of FEAM IFA Pad Configurations In some new studies, we have determined the approximate amount of flock coating resin needed (by weight) to enhance a FEAM panel's IFA properties. Ball Drop Test damaging the FEAM panel's IFA structure. The 5 Kg mass projectile hit at 1 meter (100 cm) was quite severe compared to the impact event that occurred with the Ball Drop 1.7 Kg at a 50 cm drop height.

To better interpret Table 6 in terms of the effect of FL % of these resin coated flock FEAM panels, all the FL % data in Table 6 were averaged to generate Table 7. As shown, it appears that the concentration of resin coating on the flock fibers in one embodiment should be at least about 2.5% (by weight).

TABLE 6

FL % of Resin Coated Flocked FEAM After Successive "Hits"(c)

| Lab ID | Description All panels wrapped in micro-suede fabric and perimeter sewn; Clear satin, Minwax ® Polyurethane varnish (solvent based) material using spray can dispenser | Hit # | Thickness (mm) | Areal Density (g/m2) | FL % BB 50 cm |
|---|---|---|---|---|---|
| 79-C | FX451-2D//FX451-2D//FX451-2D | 1 | 13.6 | 2940 | 13 |
|  |  | 2 |  |  | 10 |
|  |  | 3 |  |  | 11 |
|  |  | 4 |  |  | 13 |
|  |  | 5 |  |  | 11 |
| 80-A | FX451-2D//FX451-2D//FX451-2D [0.6%] | 1 | 13.5 | 3017 | 9 |
|  |  | 2 |  |  | 9 |
|  |  | 3 |  |  | 7 |
|  |  | 4 |  |  | 13 |
|  |  | 5 |  |  | 13 |
| 80-B | FX451-2D//FX451-2D//FX451-2D [2.5%] | 1 | 13.7 | 3260 | 14 |
|  |  | 2 |  |  | 21 |
|  |  | 3 |  |  | 18 |
|  |  | 4 |  |  | 15 |
|  |  | 5 |  |  | 18 |
| 80-C | FX451-2D//FX451-2D//FX451-2D [6.9%] | 1 | 13.8 | 3358 | 16 |
|  |  | 2 |  |  | 16 |
|  |  | 3 |  |  | 19 |
|  |  | 4 |  |  | 18 |
|  |  | 5 |  |  | 16 |

Data in Tables 6 and 7 show that for FEAM test panels composed of 45 denier, 2 mm long flock fibers one will need at least an amount of coating of 2.5 to 6.9% (by weight) to be effective. The Force Loss per cent (FL %) values for sample 80-B (2.5% by weight coating added) and sample 80-C (6.9% by weight coating added) were over 40% higher than for the non-coated flock FEAM control panel 79-C.

Successive "Hit" Results: In some previous IFA tests (refer to Table 4) it was noted that the FL % properties of these resin coated flock FEAM panels would deteriorate after each successive "Hit" of the ball. Data are presented in Table 6 to further investigate this effect. The samples listed in Table 6 were subjected to five (5) consecutive Ball Drop "hits". As indicated in Table 6, there is little or no discernible change in the FEAM panel's FL % upon five (5) consecutive Ball Drop "Hits". These results differ from the data reported in Table 4. The important difference here is the fact that the data reported in Table 4 were obtained by a 5 Kg projectile. The projectile mass used to generate the Table 6 data was only 1.7 Kg at a 50 cm drop height. It is obvious that the heavy 5 Kg projectile used for the Table 4 data was Table 6 Conclusion The deterioration in FL % properties (Table 6) for resin coated flocked surface FEAM panels for successive "hits" was not observed. The 1.7 Kg Ball Drop projectile dropped from a height of 50 cm was not severe enough to irreversibly damage the resin coated flock FEAM internal IFA "structure."

TABLE 7

Average FL % of Resin Coated Flock FEAM Configurations

| Lab ID | Description All panels wrapped in micro-suede fabric and perimeter sewn; Clear satin, Minwax ® Polyurethane varnish (solvent based) material using spray can dispenser | Thickness (mm) | Areal Density (g/m$^2$) | FL % BB 50 cm |
|---|---|---|---|---|
| 79-C | FX451-2D//FX451-2D//FX451-2D [0%] | 13.6 | 2940 | 12 |
| 80-A | FX451-2D//FX451-2D//FX451-2D [0.6%] | 13.5 | 3017 | 10 |
| 80-B | FX451-2D//FX451-2D//FX451-2D [2.5%] | 13.7 | 3260 | 17 |
| 80-C | FX451-2D//FX451-2D//FX451-2D [6.9%] | 13.8 | 3358 | 17 |
| | No Panel Base "Hit"(Newtons) - - - - - - - - - -> | | | 2998 |

All FL % data are the average of five determinations.

Conclusions for Table 7:

Ball drop data further confirms that coating the flock fibers in FEAM panels improves the FL % properties of so-fabricated panels. These data also show the coating level (by weight) should be between 2% to about 7% to get a FL % enhancement effect. It is noted that an excess of resin coating on the FEAM's flock surface is not beneficial because the heavier the flock's resin coating, the higher the areal density of the modified panel. Therefore, the preferred range of resin added to the FEAM structure is approximately about 2% to about 10% by weight.

It should be understood, however, that the foregoing description of the invention is intended to be merely illustrative thereof and that other embodiments, modifications and equivalents may be apparent to those skilled in the art without departing from the principles of the invention.

We claim:

1. An impact force absorbing structure comprising:
   a substrate;
   a plurality of monofilament flock fibers, each having first and second ends, each of the plurality of monofilament flock fibers being attached by an adhesive at the first ends to a surface of the substrate with the second ends extending away from the substrate;
   a divider fabric disposed adjacent to the second ends of each of the plurality of monofilament flock fibers;
      a surface coating applied to a surface of each of the plurality of flocked and attached monofilament flock fibers adjacent to the first ends of the monofilament flock fibers and disposed between the divider fabric and the substrate; and
   wherein the surface coating comprises one of:
      a flat finish polyurethane based varnish spray;
      a gloss finish varnish spray;
      a semi-gloss finish varnish spray;
      a water based acrylic varnish spray coating;
      a pigmented spray paint with nano-silica particles;
      a pigmented spray paint with alumina particles;
      a silica friction enhancing component; and
      alumina powder.

2. The impact force absorbing structure of claim 1, further comprising an adhesive coating on the divider fabric; and
   wherein the divider fabric is bonded to the second ends of each of the plurality of the surface coated monofilament flock fibers.

3. The impact force absorbing structure of claim 2, wherein the divider fabric comprises a resinous surface coated divider fabric.

4. The impact force absorbing structure of claim 1 wherein a denier of each of the plurality of the surface coated monofilament flock fibers is about two to about 20 and a thickness of the surface coating is about one to about five micrometers.

5. The impact force absorbing structure of claim 1 wherein a denier of each of the plurality of the surface coated monofilament flock fibers is about 20 to about 100 and a thickness of the surface coating is about five to about ten micrometers.

6. The impact force absorbing structure of claim 1, further comprising:
   a second substrate disposed adjacent to the second ends of each of the plurality of monofilament flock fibers;
   a second plurality of monofilament flock fibers, each having first and second ends, each of the second plurality of monofilament flock being attached, at the first end to a surface of the second substrate with the second end of each of the second plurality of monofilament flock fibers extending away from the second substrate;
   a surface coating applied to each of the second plurality of monofilament flock fibers; and
   wherein the surface coating is applied on a portion of each of the second plurality of monofilament flock fibers adjacent to the first end.

7. The impact force absorbing structure of claim 1, where each of the plurality of the surface coated monofilament flock fibers has a fiber length of about 1 mm to about 7.5 mm.

8. The impact force absorbing structure of claim 1, where each of the plurality of the surface coated monofilament flock fibers has a denier of about 15 denier to about 100 denier.

9. The impact force absorbing structure of claim 1, wherein the surface coating on the surface of the plurality of monofilament flock fibers adjacent to the first end comprises a resin.

10. The impact force absorbing structure of claim 1, wherein the surface coating is disposed along the length of each of the plurality of flocked and attached monofilament flock fibers.

11. The impact force absorbing structure of claim 9, wherein a range of the surface coating applied to the surface of each of the plurality of monofilament flock fibers adjacent to the first end is approximately about 2% to about 10% by weight.

12. An impact force absorbing structure comprising:
    a substrate;
    a plurality of monofilament flock fibers, each having first and second ends, each of the plurality of monofilament flock fibers being attached by an adhesive at the first ends to a surface of the substrate with the second ends extending away from the substrate;
    a divider fabric disposed adjacent to the second ends of each of the plurality of monofilament flock fibers;
       a surface coating applied to a surface of each of the plurality of flocked and attached monofilament flock fibers adjacent to the first ends of the monofilament flock fibers and disposed between the divider fabric and the substrate;
    wherein the surface coating comprises one of:
       a flat finish polyurethane based varnish;
       a gloss finish varnish;
       a semi-gloss finish varnish;
       a water based acrylic varnish;
       a pigmented paint with nano-silica particles;
       a pigmented paint with alumina particles;
       a silica friction enhancing component; and
       alumina powder; and
    wherein the surface coating is applied by one of:
       spraying;
       dipping;
       rolling; and
       brushing.

13. The impact force absorbing structure of claim 12, further comprising:
    a cover fabric; and
    wherein the impact force absorbing structure is sewn within the cover fabric.

14. The impact force absorbing structure of claim 12, wherein the impact force absorbing structure is included in a helmet pad.

* * * * *